United States Patent [19]

Owada

[11] Patent Number: 5,940,575

[45] Date of Patent: *Aug. 17, 1999

[54] VIDEO SIGNAL RECORDING APPARATUS

[75] Inventor: Mitsuru Owada, Kanagawa-ken, Japan

[73] Assignee: Canon Kabushiki Kaisha, Tokyo, Japan

[ * ] Notice: This patent is subject to a terminal disclaimer.

[21] Appl. No.: 08/167,765

[22] Filed: Dec. 15, 1993

Related U.S. Application Data

[63] Continuation of application No. 08/084,776, Jun. 29, 1993, Pat. No. 5,280,399, which is a continuation of application No. 07/991,501, Dec. 17, 1992, abandoned, which is a continuation of application No. 07/863,385, Apr. 3, 1992, abandoned, which is a continuation of application No. 07/425,812, Oct. 23, 1989, abandoned.

[30] Foreign Application Priority Data

Oct. 25, 1988 [JP] Japan .................................. 63-270095

[51] Int. Cl.⁶ .............................. H04N 5/91; H04N 5/95
[52] U.S. Cl. ............................................. 386/95; 386/88
[58] Field of Search ............................. 360/77.14, 77.13, 360/77.15, 10.2; 356/335; 386/79, 80, 81, 37, 95, 78, 88, 46, 85, 13; H04N 5/91, 5/95

[56] References Cited

U.S. PATENT DOCUMENTS

| | | | |
|---|---|---|---|
| 4,563,710 | 1/1986 | Baldwin | 360/19.1 X |
| 4,591,931 | 5/1986 | Baumeister | 360/72.2 X |
| 4,777,537 | 10/1988 | Ueno et al. | 386/96 |
| 4,823,206 | 4/1989 | Neroto et al. | 360/77.14 X |
| 5,280,399 | 1/1994 | Owada | 360/77.14 |

OTHER PUBLICATIONS

Proposed American National Standard for component digital video recording 19mm type D–1 cassette helical data and control records SMPTE 227M 267–271.

Eguchi "The SMPTE D–1 Format and Possible Scanner Configurations" SMPTE Journal pp. 166–169.

*Primary Examiner*—Robert Chevalier
*Attorney, Agent, or Firm*—Robin, Blecker & Daley

[57] ABSTRACT

A video signal recording apparatus for recording video signals while forming m number of tracks per frame on a recording medium by using n number of rotary heads, m being an integer greater than n with n an integer of 2 or more. The apparatus is arranged to record tracking control signals cyclically on every n number of tracks.

5 Claims, 5 Drawing Sheets

VIDEO SIGNAL RECORDING APPARATUS

This application is a continuation of application Ser. No. 08/084,776, file Jun. 29, 1993, now U.S. Pat. No. 5,280,399, which is a cont. Ser. No. 07/991,501 filed Dec. 17, 1992, (now aband.), which is a cont. of Ser. No. 07/863,385 filed Apr. 3, 1992 (now aband.), which is a cont. of Ser. No. 07/425,812 filed Oct. 23, 1989 (now aband.).

BACKGROUND OF THE INVENTION

1. Field of the Invention

The present invention relates generally to a video signal recording apparatus and, more particularly, to a video signal recording apparatus of the type employing a plurality of rotary heads.

2. Description of the Related Art

It is known that video tape recorders of the rotary-head type have gained in popularity as a domestic electronic appliance. Such a rotary-head type of video type recorder (hereinafter referred to simply as "VTR") is arranged to record or reproduce video signals while forming a series of oblique tracks on a recording medium, for example, a magnetic tape. In order to increase recording density, no guard band is provided between adjacent tracks, and crosstalk occurring between adjacent tracks during reproduction is therefore suppressed by utilizing azimuth loss which is provided by making the azimuth angle of recording and reproducing heads differ between the adjacent tracks.

In such a VTR, it is necessary that the reproducing head accurately traces each track formed on the magnetic tape, and tracking control for controlling the tracing operation plays an important role.

A video signal recording apparatus of the conventional type having the ability to perform high-density recording and reproduction, for example, a digital video recorder, generally employs what is called the area-division ATF (Automatic Tracking Finding) method for purposes of tracking control. This method is known as a representative tracking method in the field of digital audio tape recorders (DAT). In accordance with such a method, each track is provided with a tracking controlling area independent of an area on which main video data is recorded, and a pilot signal is recorded in the tracking controlling area.

In this area-division ATF method, the number $\ell$ of tracks corresponding to a repetitive recording pattern of pilot signals recorded on the magnetic tape, has been selected to be equal to the number m of tracks required to record a predetermined set of signals, for example, one frame of video signals.

Recording and reproduction for the case where $m=\ell=6$; $n=4$ (n: the number of heads) are explained below with illustrative reference to FIG. 1. FIG. 1 is a diagram showing a recording pattern formed on a magnetic tape, and a series of recording tracks 2 are shown as being formed on a magnetic tape 1 which serves as a recording medium. As illustrated, since the period of each recording pattern of ATF pilot signals corresponds to the number of tracks required to record one frame of video signals, the recording pattern shown in FIG. 1 is obtained. In the figure, "Data" represents a video signal, and ATF1 to ATF6 represent a series of ATF pilot signals for one period. If tracking is performed on a tape transport system in order to reproduce such a recording pattern, it follows that servo introducing points exist for each period of the recording pattern consisting of a series of ATF pilot signals. In this case, because of $m=\ell=6$, a servo introducing point appears every six tracks. In other words, in the conventional arrangement which relies on $m=\ell$, the number of tracks required to record one frame of video signals means the number of servo introducing points in a tape transport servo system.

However, if a particular kind of video signal which contains a large amount of information, such as a high-definition television signal, is to be recorded, the number of tracks required to record video signals for one frame increases, with the result that it will take a long time until the tape transport servo system introduces its servo control. Moreover, in a case where it is assumed that the series of recording tracks 2 of FIG. 1 is subjected to recording and reproduction by means of four heads, even if each recording track 2 is subjected to recording and reproduction with the same apparatus, a track subjected to recording by a particular head may be subjected to reproduction by a different head. This is because the number of tracks corresponding to each repetitive recording pattern consisting of a sequence of ATF pilot signals differs from the number of heads. If recording and reproduction of the tracks are not performed by the same head, the recording and reproducing operations may become unstable due to variations in characteristics between the heads even by employing the same apparatus (self-recording and self-reproduction) which should realize recording and reproduction of optimum characteristics.

In brief, the conventional method has the following two problems: (1) the fact that if a video signal containing a very large amount of information, such as a high-definition television signal, is to be recorded and reproduced, a period of time required to introduce the tracking servo increases; and (2) the fact that, since tracks are not always subjected to recording and reproduction by the same recording/reproducing head even in the case of self-recording and self-reproduction, optimum characteristics are not obtained because of the influence of variations in the characteristics of the heads.

SUMMARY OF THE INVENTION

It is, therefore, an object of the present invention to solve the above-described problems.

It is another object of the present invention to provide a video signal recording apparatus which is capable of reproducing a video signal through the same head as that used in recording it even if a video signal which conveys a large amount of information per frame is to be recorded and reproduced, as well as one which makes it possible to reduce a period of time required to introduce tracking control.

To achieve the above objects, in accordance with the present invention, there is provided a video signal recording apparatus which comprises: n number of rotary heads arranged to trace a recording medium to form a multiplicity of parallel tracks on the recording medium; first means for supplying video signals to the n number of heads so that the video signals are recorded on m number of tracks for each frame, m being selected to be greater than n; and second means for supplying pilot signals for tracking control to the n number of heads so that the pilot signals for tracking control are cyclically recorded on every n number of tracks.

Further objects, features and advantages of the present invention will become apparent from the following detailed description of embodiments of the present invention with reference to the accompanying drawings.

DETAILED DESCRIPTION OF THE PREFERRED EMBODIMENT

A preferred embodiment of the present invention will be explained below with reference to the accompanying drawings.

Figure 1:
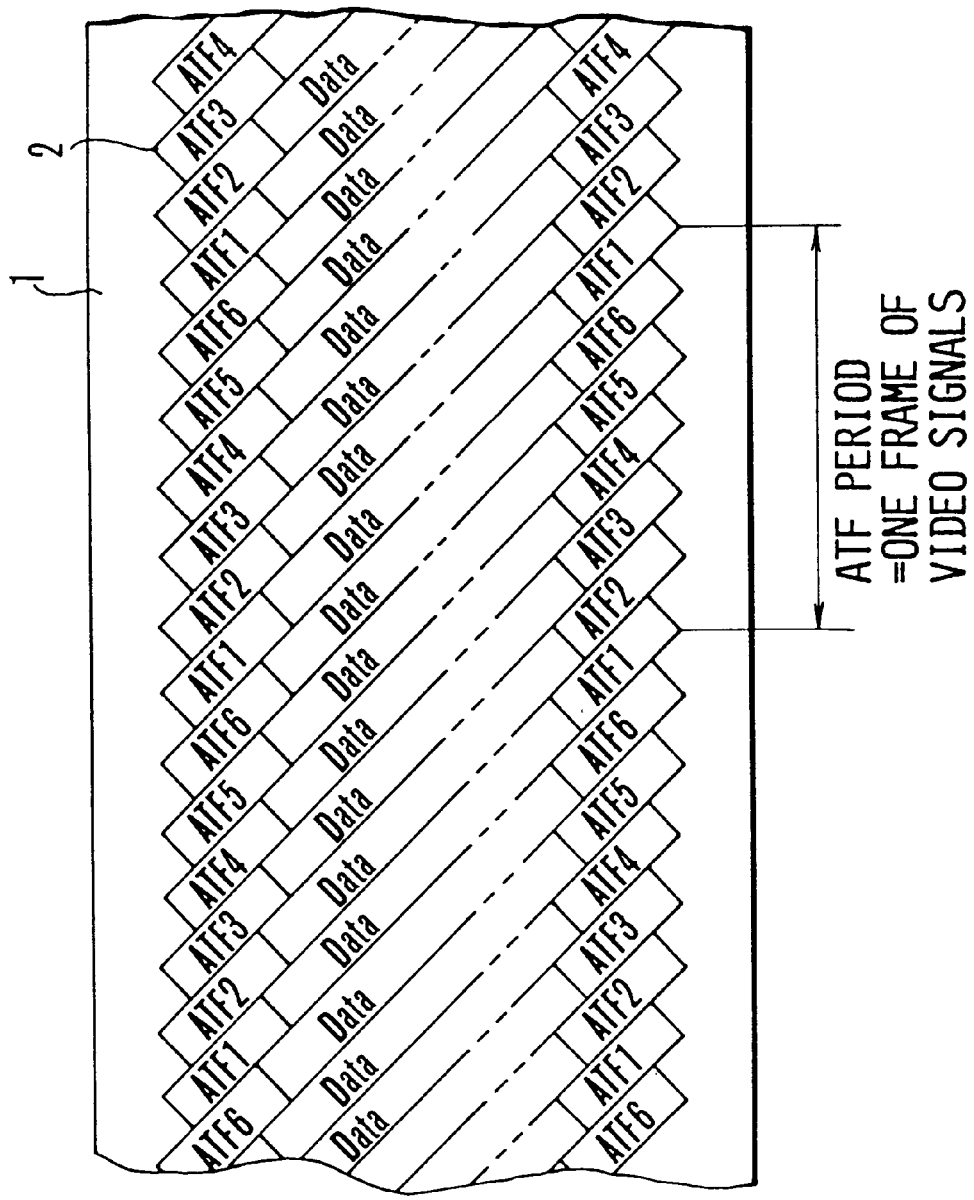
FIG. 1 is a diagram showing a recording pattern created in a conventional type of video signal recording apparatus.
Figure 2:
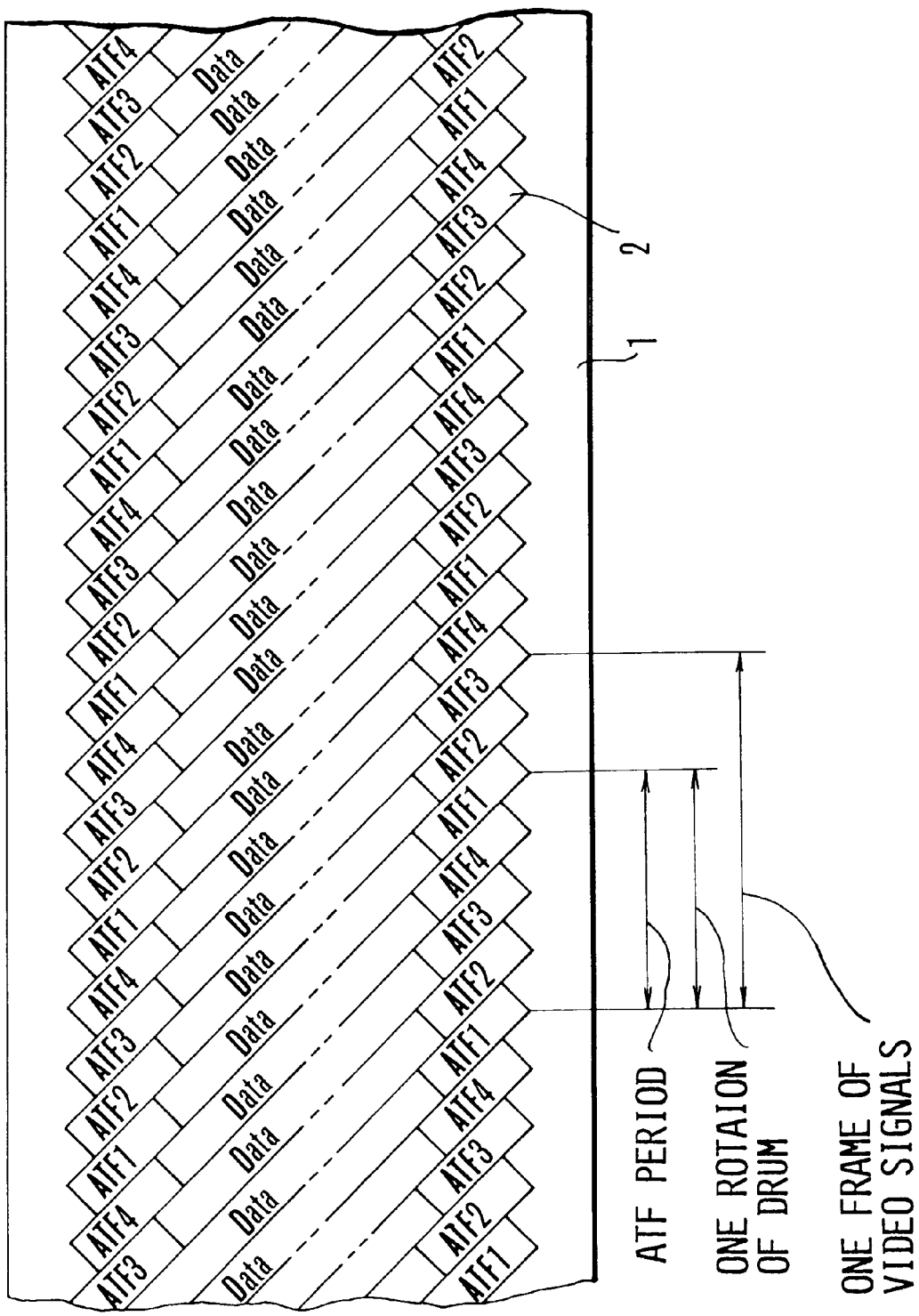
FIG. 2 is a diagram showing a recording pattern created in one embodiment of a video signal recording apparatus according to the present invention.

FIG. 2 is a diagram showing a recording pattern adopted in the embodiment of a video signal recording apparatus according to the present invention. As illustrated, a series of recording tracks 2 are formed on a magnetic tape 1 serving as a recording medium. More specifically, in FIG. 2, one example of a recording pattern is shown as being formed on the magnetic tape 1 for the case where $\ell$=n=4; m=6, where $\ell$ represents the number of tracks corresponding to each repetitive pattern consisting of a sequence of pilot signals, i.e., a recording period, m represents the number of tracks required to record one frame of video signals, and n represents the number of rotary heads. By adopting the relationship $\ell$=n, it is possible to record and reproduce signals on and from particular track by using the same head in self-recording and self-reproduction, and this relationship is maintained with respect to all the tracks. This stable relationship between recording/reproducing heads realizes video signal-recording and reproducing characteristics and tracking servo characteristics all of which are kept stable.

In the conventional method, since m is made equal to $\ell$, m=$\ell$=6 results and the intervals M at which the tracking control introducing points appear are each 6 tracks (M=6). In contrast, in the embodiment of the present invention, since M is made equal to n, such an interval becomes 4 tracks (M=n=4) so that servo introducing characteristics are improved. The effect of the improvement increases as the difference between m and $\ell$ is made large. Accordingly, the aforesaid embodiment of the present invention is extremely useful in a video signal recording apparatus of the type which handles a video signal carrying a very large amount of information, such as a high-definition television signal, that is, which requires a large number of tracks to record one frame of video signals.

Figure 3:
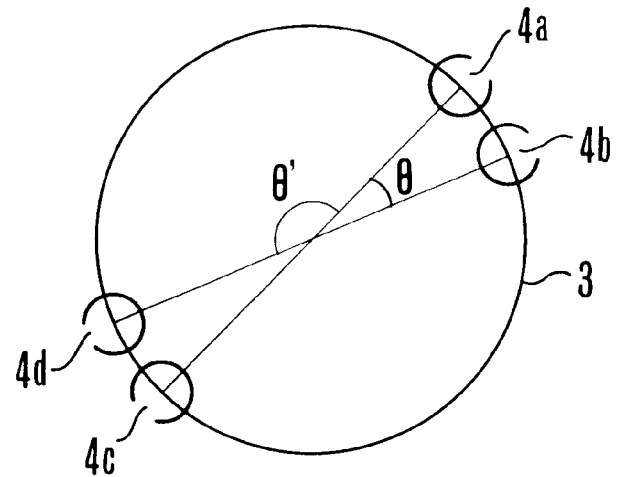
FIG. 3 is a schematic view which serves to illustrate the arrangement of heads used in the embodiment of the apparatus according to the present invention.

Referring to FIG. 3, one example of the arrangement of heads in the apparatus of the present embodiment is explained below.

In the figure, a rotary drum is denoted by 3, and heads 4a to 4d are mounted on the rotary drum 3. The heads 4a and 4b and the heads 4c and 4d are shown as being arranged close to each other, respectively. In this example, the heads 4a and 4b and the heads 4c and 4d are respectively spaced apart from each other by a predetermined distance along the axis of rotation, and the heads 4a and 4c are secured in the same rotational plane. In this arrangement, if it is assumed that a magnetic tape is transported by an amount corresponding to two tracks while the rotary drum 3 is rotating through 180°, that Z represents the distance between the heads 4a and 4b, hence the distance between the heads 4c and 4d, and that $T_p$ represents a track pitch, then Z is given by:

$$Z = \left(T_P - T_P \times \frac{\theta}{180} \times 2\right)$$

As Θ approaches 0, Z becomes approximately equal to $T_p$ (Z≈$T_p$).

Figure 4:
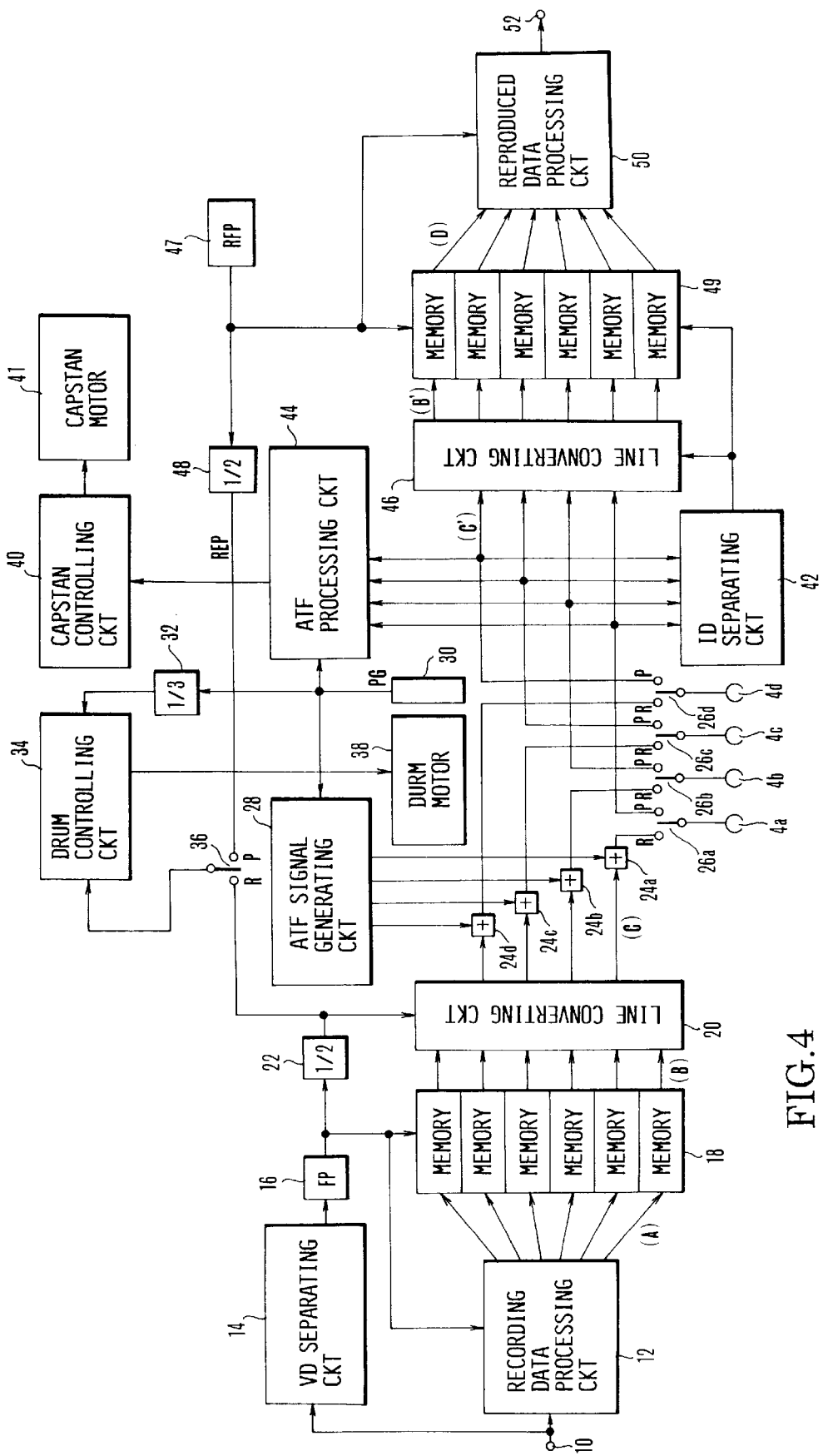
FIG. 4 is a block diagram showing the general construction of the entire apparatus according to the embodiment of the present invention.
Figure 5:
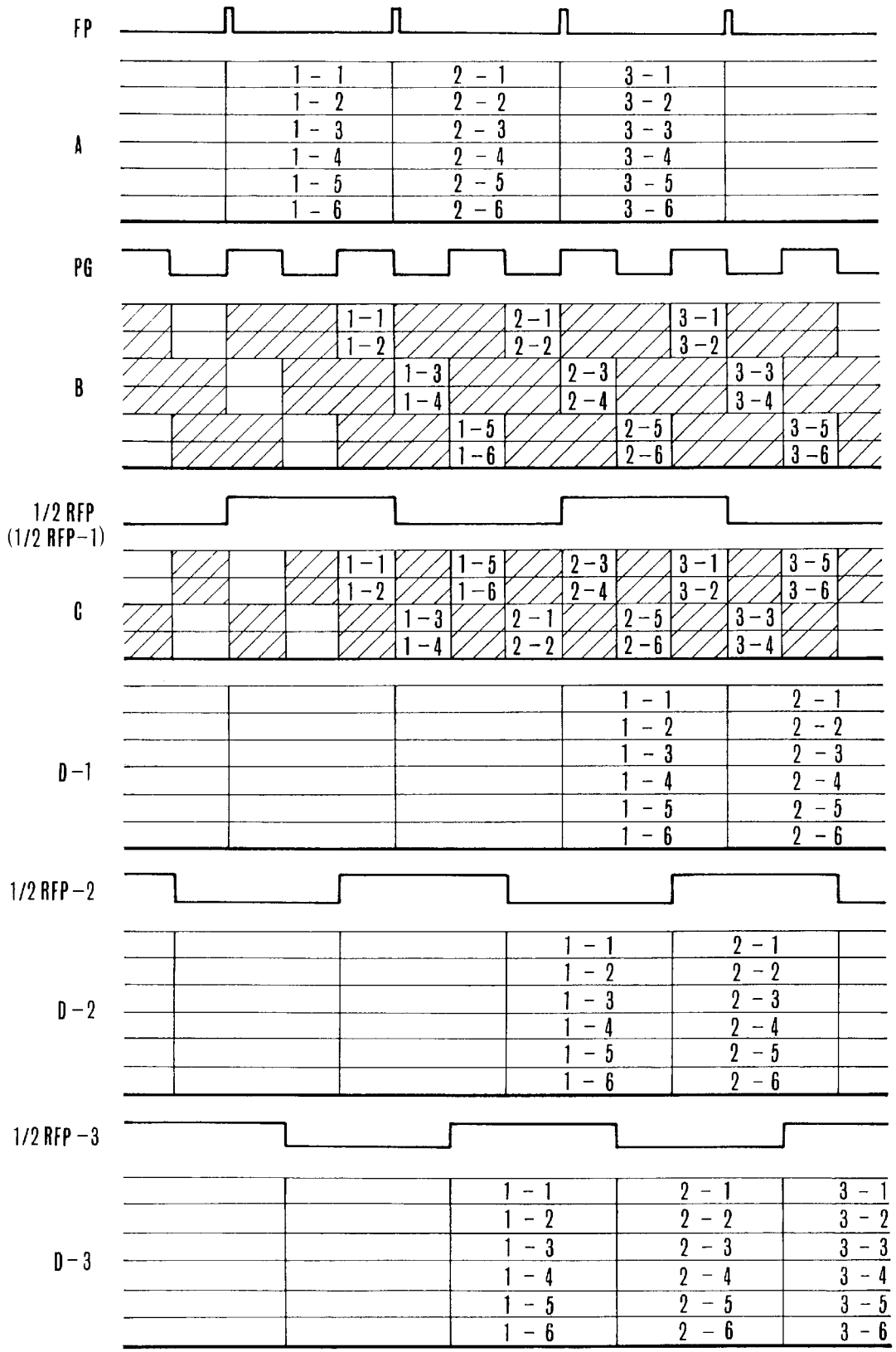
FIG. 5 is a timing chart which serves to illustrate the operation of each portion in the construction shown in FIG. 4.

FIG. 4 is a block diagram showing the general construction of the entire apparatus according to the present embodiment, and FIG. 5 is a timing chart which serves to illustrate the operation of each portion in the apparatus shown in FIG. 4.

In FIG. 4, reference numeral 10 denotes an input terminal to which a video signal to be recorded is provided. The input video signal is supplied to a recording data processing circuit 12 and a vertical synchronizing signal (VD) separating circuit 14. The vertical synchronizing signal (VD) extracted by separation in the VD separating circuit 14 is supplied to a frame pulse (FP) generator 16, where a frame pulse (FP) such as that shown in Part FP of FIG. 5 is generated.

The recording data processing circuit 12 effects processing of the video signal at a timing according to the frame pulse (FP). This video signal processing circuit 12 performs predetermined processes such as sampling, encoding, addition of an error correcting code, a synchronizing code and an index code (ID), and the like, and outputs the results as six lines of data arrays. Part A of FIG. 5 diagrammatically shows the six lines of data output from the circuit 12. In each of the numbers 1—1 to 3—6 shown in the figure, the left-hand number indicates a frame number and the right-hand number indicates a line number. As can be seen from the figure, the recording data processing circuit 12 outputs six lines of data containing a set of video data for one frame during the duration of each frame pulse (FP). At this time, the frame number and the line number are recorded as the index code added to each piece of video data.

Reference numeral 18 denotes six memories for effecting time-axis compression. These memories 18 receive six lines of data from the recording data processing circuit 12, then compress the corresponding data along their time axes to ⅓ in units of frame periods, and then outputs the compressed data arrays at the timings shown in Part B of FIG. 5. In Part B, each hatched portion indicates the period during which no data is transferred. The timings of writing to and reading from these memories 18 are common to each frame, and are controlled in accordance with the frame pulse (FP) output from the circuit 16.

The six lines of data which have been subjected to time-axis compression in the respective memories 18 are supplied to a line converting circuit 20, where the six lines are converted into four lines. For this conversion, the same process is repeated in each period corresponding to two frames. Accordingly, the line conversion is performed at a timing according to a pulse (½ FP) of a two-frame period which is output from a ½ frequency divider 22. The four lines of data output from the line converting circuit 20 are as shown in Part C of FIG. 5. The four lines of data are respectively supplied to the heads 4a, 4b, 4c and 4d through adders 24a, 24b, 24c and 24d and the R sides of corresponding switches 26a, 26b, 26c and 26d.

An ATF signal generating circuit 28 supplies four kinds of pilot signals for tracking control to the corresponding adders 24a, 24b, 24c and 24d at timings at which the heads 4a, 4b, 4c and 4d trace the areas indicated by ATF1, ATF2, ATF3 and ATF4 in FIG. 2, respectively. The timing of generation of such an ATF pilot signal is determined by a rotation detection pulse (PG) whose period is the same as the rotational period of the drum 3 and which is reversed at a timing at which the heads 4a and 4b start to trace the tape 1 and at a timing at which the heads 4c and 4d start to trace the tape 1. In the meantime, the four lines of data in each of which a ⅓ frame period containing data and a ⅓ frame period containing no data alternately appear are supplied to the respective adders 24a, 24b, 24c and 24d. The ATF pilot signal is added to the portions of each of the four lines of data which last for a predetermined period immediately before and after the aforesaid ⅓ frame period which contains the data.

The rotation detection pulse (PG) generated by a rotation sensor 30 is frequency-divided by a ⅓ frequency divider 32, and is then supplied to one input of a drum controlling circuit 34. In the meantime, the frame pulse (½ FP) output from the ½ frequency divider 22 is supplied to another input of the drum controlling circuit 34 through a terminal R of a switch 36. The drum controlling circuit 34 then compares the phase of the output from the ½ frequency divider 22 and that of the output from the ⅓ frequency divider 32. Thus the drum controlling circuit 34 controls rotation of a drum motor 38 in such a manner that the timing of the output from the ½ frequency divider 22 is made coincident with the timing of the output from the ⅓ frequency divider 32.

With the above-described arrangement and construction, it is possible to effect recording according to a recording format such as that shown in FIG. 2. Incidentally, during recording, a capstan motor 41 is controlled by a capstan controlling circuit 40 to transport the tape 1 by an amount corresponding to four tracks each time the drum 3 makes one rotation.

Then, reproducing operation is explained below. During reproduction, all the switches 26a, 26b, 26c, 26d and 36 are switched to P sides, respectively. The individual outputs from the heads 4a, 4b, 4c and 4d are supplied to an ID separating circuit 42, an ATF processing circuit 44 and a line converting circuit 46. A reference oscillator 47 generates a reference pulse (RFP) of a one-frame period, and a ½ frequency divider is denoted by 48. During reproduction, the drum controlling circuit 34 controls the drum motor 38 in such a manner that the reference pulse (½ RFP) which is frequency-divided by 2 in the ½ frequency divider 48 is maintained in phase with the rotation detection pulse PG which is frequency-divided by 3.

In the case of the control described above, if the rotation detection pulse PG has a phase such as that shown in Part PG of FIG. 5, the reference pulse (½ RFP) assumes any of the phases shown in Parts ½ RFP-1, RFP-2 and ½ RFP-3 of FIG. 5.

The ATF processing circuit 44 separates the ATF pilot signals from the four lines of reproduced data signals in accordance with the rotation detection pulse PG, effects known processes, and supplies the resulting tracking control signal to the capstan controlling circuit 40. The tracking control signal obtained in this step is a signal which serves to control a capstan (not shown) so that the heads 4a, 4b, 4c and 4d can trace the tracks recorded by themselves. In accordance with this tracking control signal, the heads 4a, 4b, 4c and 4d output reproduced data such as that shown in Part C of FIG. 5.

The line converting circuit 46 is a circuit for converting the four lines of reproduced data supplied from the respective heads to the former six lines of data. Assignment of the four lines to the six lines is determined in accordance with the line numbers which have been recorded as the index codes (ID) added to the individual pieces of video data, the line numbers being read out by the ID separating circuit 42. Accordingly, the output from the line converting circuit 46 is as shown in Part B of FIG. 5.

Six memories, denoted by 49, are provided for effecting time-axis expansion of the six lines of data, supplied from the line converting circuit 46 so that their frame periods compressed to ⅓ are made three times as great in length. These memories 49, furthermore, delay the respective lines of data by an appropriate amount. The timing of reading from these memories 49 is determined in accordance with the reference pulse RFP. In this case, in order that a set of data of the same frame be read out at the same timing, the amounts of delay time in the respective memories 49 are determined in accordance with the frame numbers contained in the index codes (ID) separated by the ID separating circuit 42. More specifically, with respect to the reproduced data shown in Part C of FIG. 5, the data is read from the memories 49 at the timing shown in Part D-1 of FIG. 5 for the case when the reference pulse (½ RFP) has the phase shown in Part ½ RFP-1 of FIG. 5, at the timing shown in Part D-2 of FIG. 5 for the case when it has the phase shown in Part ½ RFP-2 of FIG. 5, or at the timing shown in Part D-3 of FIG. 5 for the case when it has the phase shown in Part ½ RFP-3 of FIG. 5.

A reproduced data processing circuit 50 effects processes reverse to those executed in the recording, such as error correction, decoding, digital-to-analog conversion and the like at a timing according to the reference pulse RFP, and then outputs one line of analog video signals through a terminal 52.

In a digital video tape recorder to which the above-described embodiment is applied, the respective heads 4a, 4b, 4c and 4d reproduce tracks recorded by themselves so that satisfactory recording/reproduction characteristics can be obtained. Accordingly, it is possible to obtain faithfully reproduced video signals and to achieve accurate tracking control.

Figure 6:
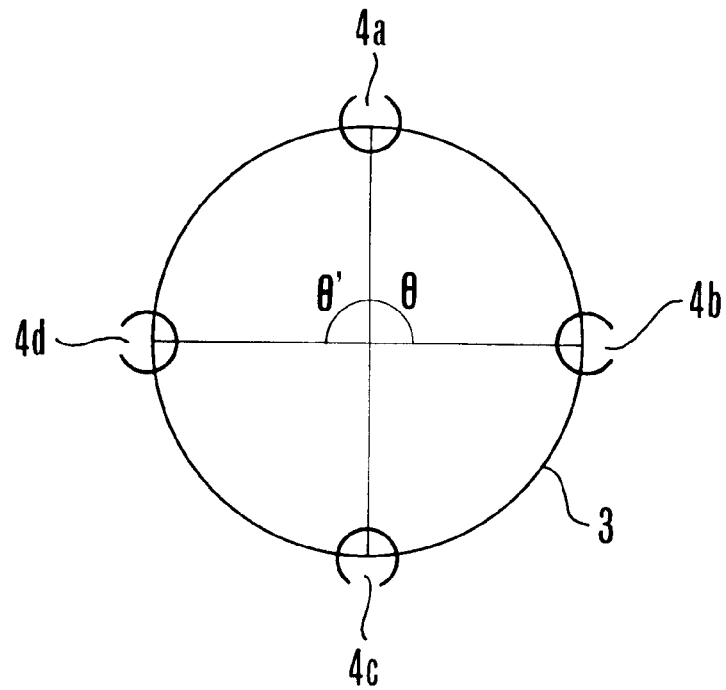
FIG. 6 is a schematic view showing the arrangement of heads according to one modification of the embodiment.

FIG. 6 is a view showing a head arrangement according to a modification of the embodiment of the present invention. As illustrated, this modification is arranged so that the heads 4a, 4b, 4c and 4d rotate with a phase difference of 90° in the same rotational plane. The present invention can also be likewise applied to this head arrangement. For example, in a case where an apparatus of the kind shown in FIG. 4 is constructed using such a head arrangement, the timings of outputs from the memories 18 may be shifted by a ⅙ frame period with respect to the data assigned to the line numbers 2, 4 and 6, and the subsequent processes may be executed at a timing according to this amount of shift.

The present embodiment has been explained with reference to the case where the number n of heads and the number $\ell$ of tracks corresponding to each repetitive recording pattern consisting of a sequence of pilot signals are each four and the number m of recording tracks assigned to one frame of video signals are six. It will be appreciated by those skilled in the art that, in accordance with the present invention, even in a general arrangement based on n=$\ell$, it is possible to bring about advantages and effects similar to those achieved in the case of n<m.

As is apparent from the foregoing, in accordance with the present invention, it is possible to reduce a period of time required to introduce tracking control in a recording and reproducing system employing a plurality of heads and it is

What is claimed is:

1. A video signal recording and reproducing apparatus, comprising:

(A) n recording and reproducing heads for recording m groups of image data on m tracks into which each frame of the image data is divided, additional data indicating a reference number of a track among the m tracks, and pilot signals for tracking control cyclically on every (n×i) number of tracks, the n recording and reproducing heads reproducing the image data, the additional data and the pilot signals, in being an integer, n being an integer which is 2 or more, and m being an integer which is greater than n;

(B) first extraction means for extracting the pilot signals from reproduction outputs of the n recording and reproducing heads;

(C) tracking control means for controlling tracking of the n recording and reproducing heads on the basis of the pilot signals extracted by the first extraction means so that the n recording and reproducing heads mainly trace tracks formed by themselves respectively;

(D) second extraction means for extracting the additional data from reproduction outputs of the n recording and reproducing heads;

(E) restoring means for restoring the image data from reproduction outputs of the n recording and reproducing heads on the basis of the additional data extracted by the second extraction means.

2. An apparatus according to claim 1, wherein m is 6, i is 1 and n is 4.

3. An apparatus according to claim 1, wherein the additional data further indicate an order of certain data among continuous plural image data.

4. An apparatus according to claim 1, wherein the image data include encoded digital data.

5. An apparatus according to claim 4, further comprising decoding means for decoding the image data restored by the restoring means.

* * * * *

UNITED STATES PATENT AND TRADEMARK OFFICE
CERTIFICATE OF CORRECTION

PATENT NO. : 5,940,575
DATED : August 17, 1999
INVENTOR(S) : Mitsuru Owada

It is certified that error appears in the above-identified patent and that said Letters Patent is hereby corrected as shown below:

Col. 7, line 14, delete "in being" and insert -- i being --.

Signed and Sealed this

Twelfth Day of September, 2000

Attest:

Q. TODD DICKINSON

Attesting Officer        Director of Patents and Trademarks